United States Patent [19]
Takahashi et al.

[11] Patent Number: 5,757,759
[45] Date of Patent: May 26, 1998

[54] OPTICAL DISK DATA RECORDING AND REPRODUCTION WITH OPPOSED POLARITY IN ADJACENT TRACKS

[75] Inventors: Toshihiko Takahashi, Kawachinagano; Yukinori Okazaki, Hirakata, both of Japan

[73] Assignee: Matsushita Electric Industrial Co., Ltd., Japan

[21] Appl. No.: 719,570

[22] Filed: Sep. 25, 1996

[30] Foreign Application Priority Data

Sep. 26, 1995 [JP] Japan ................... 7-247254

[51] Int. Cl.⁶ ................................................ G11B 7/00
[52] U.S. Cl. .................. 369/116; 369/275.3; 369/59; 369/124
[58] Field of Search ...................... 369/116, 48, 59, 369/44.41, 124, 275.3, 275.4, 44.26

[56] References Cited

U.S. PATENT DOCUMENTS

| | | | |
|---|---|---|---|
| 4,734,901 | 3/1988 | Murakami | 369/59 |
| 4,980,877 | 12/1990 | Sugiyamam et al. | 369/44.41 |
| 5,452,284 | 9/1995 | Miyagawa et al. | 369/124 |

*Primary Examiner*—Tod R. Swann
*Assistant Examiner*—Kim-Kwok Chu
*Attorney, Agent, or Firm*—Parkhurst & Wendel

[57] ABSTRACT

An information recording apparatus includes a laser source emitting a laser beam for reproducing or recording data pits on a recording medium; an objective lens; a photodetector; an analog signal processing means performing amplification and waveform shaping for an electric signal output from the photodetector; a land/groove detecting means and outputting a polarity switch instruction signal; a reproduction signal polarity switch means for changing the signal polarity at reproduction in response to the polarity switch instruction signal from the land/groove detecting means; a controller for controlling the information recording apparatus at the request of a host computer performing control and process as a whole; a recording pulse modulating means for modulating a recording pulse on the instruction from the controller; a polarity switch means for changing the polarity of an output from the recording pulse modulating means; a recording signal polarity switch means for changing the signal polarity at recording in response to the polarity switch instruction signal from the land/groove detecting means by selecting one of an output from the polarity switch means and an output from the recording pulse modulating means, and outputting a recording data signal; and a laser driving means for controlling the laser source in response to the recording data signal from the recording signal polarity switch means, whereby the recording polarity of the data pits is switch between adjacent tracks on the recording medium, resulting in recording and reproduction of signals which are hardly affected by crosstalk between the adjacent tracks.

18 Claims, 10 Drawing Sheets

PRIOR ART

1

OPTICAL DISK DATA RECORDING AND REPRODUCTION WITH OPPOSED POLARITY IN ADJACENT TRACKS

FIELD OF THE INVENTION

The present invention relates to an information recording apparatus for recording or reproducing signals, such as an optical disk apparatus. The invention also relates to an information recording medium and a recording method.

BACKGROUND OF THE INVENTION

In recent years, information recording apparatus and information recording media have rapidly progressed for mass storage and miniaturization.

A conventional signal recording and reproducing system will be described hereinafter with reference to FIGS. 9 and 10.

FIG. 9 is a block diagram illustrating an example of a conventional signal recording and reproducing apparatus. FIG. 10 is a schematic diagram illustrating data pits on a recording medium.

In FIG. 9, reference numeral 9 designates a recording medium having tracks, i.e., lines of data pits 93 (refer to FIG. 10), on its surface, wherein information is recorded. A laser beam 14 emitted from a laser source 11 travels through a beam splitter 13 and is focused on the track on the recording medium 9 by an objective lens 12. A portion of the light beam 14 is reflected at the recording medium 9, and the reflected light is again reflected by the beam splitter 13 to a photodetector 15. In the photodetector 15, the light beam is detected and converted to an electric signal, i.e., a signal 101 to be reproduced (hereinafter referred to as a reproduction signal).

The reproduction signal 101 is input to an analog signal processing circuit 1, wherein the signal is subjected to amplification, noise shaping to eliminate noise from the signal, and other processes. An output signal 102 from the analog signal processing circuit 1 is input to a peak detector 23. The peak detector 23 detects timing of a peak of the reproduction signal 102 having data and outputs a digitized signal 103. The digitized signal 103 is input to a clock extractor 22, wherein a clock component of the signal 103 is extracted. An output signal from the clock extractor 22 is input to a controller 7, wherein errors in the data are corrected. In this way, information recorded in the recording medium 9 is reproduced.

On the other hand, recording of information is performed according to the following process steps. That is, output data 701 from the controller 7, i.e., data to be recorded, is input to a recording pulse generator 62, wherein the pulse width and the timing are optimized. Then, an output from the recording pulse generator 62 is input to a laser control means 61. The laser control means 61 modulates the laser source 11, and the laser beam 14 emitted from the laser source 11 forms data pits 93 on the recording medium 9.

As shown in FIG. 10, data pits 93 are formed on a track E 91 and a track F 92. When the track E 91 is reproduced, the reproduced analog signal E 901 has a waveform shown by the solid line in FIG. 10. When crosstalk occurs due to the adjacent track F 92, the signal E 901 has a waveform shown by the dotted line.

In the conventional information recording and reproducing apparatus, information is recorded with the same polarity for all tracks. Therefore, when the track pitch is reduced to increase the recording density, the data pits on the adjacent tracks interfere each other at the reproduction, resulting in crosstalk that reduces the reliability of the reproduced signal. So, there is a limitation in the high-density recording by the reduction in the track pitch.

In case of pit position recording, the polarity of a signal having data of an interference signal from the adjacent track, caused by crosstalk, becomes the same as the polarity of a signal to be reproduced. In this case, misdetection of data easily occurs.

Therefore, for an apparatus and a medium for recording and reproducing information, such as an optical disk apparatus and an optical disk, reduction in crosstalk is an important factor to increase the recording density.

SUMMARY OF THE INVENTION

It is an object of the present invention to provide an information recording apparatus, an information recording medium, and a recording method, which can achieve high-density recording of information by reducing the track pitch, using a recording and reproducing system that can reduce undesired influences of crosstalk by changing the recording polarity of data pits between adjacent tracks.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, an information recording apparatus comprises a laser source emitting a laser beam for reproducing or recording data pits on a recording medium; an objective lens for focusing the laser beam in a spot on the recording medium; a photodetector for converting the laser beam reflected at the recording medium into an electric signal; a signal processor for processing the electric signal output from the photodetector; and means for changing the polarity of data signals to be recorded on tracks having the data pits, between adjacent tracks.

According to a second aspect of the present invention, the above-mentioned apparatus includes an even/odd judge means for judging whether a track address is even or odd and outputting a polarity switch instruction signal; and a polarity switch means for changing the polarity of a data signal to be recorded in response to the polarity switch instruction signal from the even/odd judge means.

According to a third aspect of the present invention, the above-mentioned apparatus includes a land/groove detecting means for detecting whether the spot of the focused light beam on the recording medium is in a land or a groove and outputting a polarity switch instruction signal; and a polarity switch means for changing the polarity of the data signal to be recorded in response to the polarity switch instruction signal from the land/groove detector.

According to a fourth aspect of the present invention, the above-mentioned apparatus includes an even/odd judge means for judging whether a track address is even or odd and outputting a polarity switch instruction signal; an operating means for generating a desired pulse width using an arithmetic element to change a recording pulse width at recording; and a pulse width switch means for changing the recording pulse width in response to the polarity switch instruction signal from the even/odd judge means.

According to a fifth aspect of the present invention, the above-mentioned apparatus includes a land/groove detecting means for detecting whether the spot of the focused light beam on the recording medium is in a land or a groove and outputting a polarity switch instruction signal; an operating means for generating a desired pulse width using an arithmetic element to change a recording pulse width at recording; and a pulse width switch means for changing the recording pulse width in response to the polarity switch instruction signal from the land/groove detecting means.

According to a sixth aspect of the present invention, the above-mentioned apparatus includes an even/odd judge means for judging whether a track address is even or odd and outputting a polarity switch instruction signal; a signal switch means for changing the polarity of the data signal to be recorded at recording; and a polarity switch means for selecting one of the data signal changed by the signal switch means and the data signal before the change, in response to the polarity switch instruction signal from the even/odd judge means, wherein the polarity of a data pit line to be recorded is changed between adjacent tracks by changing the data signal to be recorded in response to the polarity switch instruction signal from the even/odd judge means.

According to a seventh aspect of the present invention, the above-mentioned apparatus includes a land/groove detecting means for detecting whether the spot of the focused light beam on the recording medium is in a land or a groove and outputting a polarity switch instruction signal to change the polarity of a data signal to be recorded; a signal switch means for changing the polarity of the data signal to be recorded at recording; and a polarity switch means for selecting one of the data signal changed by the signal switch means and the data signal before the change, in response to the polarity switch instruction signal from the land/groove detecting means, wherein the polarity of a data pit line to be recorded is changed between adjacent tracks by changing the data signal to be recorded in response to the polarity switch instruction signal from the land/groove detecting means.

According to an eighth aspect of the present invention, the above-mentioned apparatus includes an even/odd judge means for judging whether a track address is even or odd and outputting a polarity switch instruction signal; and a reproduction signal polarity switch means for changing the polarity of the recorded data pit in response to the polarity switch instruction signal from the even/odd judge means when recorded data is reproduced from the recording medium.

According to a ninth aspect of the present invention, the above-mentioned apparatus includes a land/groove detecting means for detecting whether the spot of the focused light beam on the recording medium is in a land or a groove and outputting a polarity switch instruction signal; a reproduction signal polarity switch means for changing the polarity of the recorded data pit in response to the polarity switch instruction signal from the land/groove detecting means when recorded data is reproduced from the recording medium.

According to a tenth aspect of the present invention, the above-mentioned apparatus includes an analog signal processing means performing amplification and waveform shaping for the electric signal output from the photodetector; a land/groove detecting means for detecting whether the spot of the focused light beam on the recording medium is in a land or a groove from an output from the analog signal processing means, and outputting a polarity switch instruction signal; a reproduction signal polarity switch means for changing the signal polarity at reproduction in response to the polarity switch instruction signal from the land/groove detecting means; a controller for controlling the information recording apparatus at the request of a host computer performing control and process as a whole; a recording pulse modulating means for modulating a recording pulse on the instruction from the controller; a polarity switch means for changing the polarity of an output from the recording pulse modulating means; a recording signal polarity switch means for changing the signal polarity at recording in response to the polarity switch instruction signal from the land/groove detecting means by selecting one of an output from the polarity switch means and an output from the recording pulse modulating means, and outputting a recording data signal; and a laser driving means for controlling the laser source in response to the recording data signal from the recording signal polarity switch means.

According to an eleventh aspect of the present invention, the above-mentioned apparatus includes an analog signal processing means performing amplification and waveform shaping for the electric signal output from the photodetector; a track address detecting means for detecting a track address from an output signal from the analog signal processing means; an even/odd judge means for judging whether the track address detected by the track address detecting means is even or odd, and outputting a polarity switch instruction signal; a reproduction signal polarity switch means for changing the signal polarity at reproduction in response to the polarity switch instruction signal from the even/odd judge means; a controller for controlling the information recording apparatus at the request of a host computer performing control and process as a whole; a recording pulse modulating means for modulating a recording pulse on the instruction from the controller; a polarity switch means for changing the polarity of an output from the recording pulse modulating means; a recording signal polarity switch means for changing the signal polarity at recording in response to the polarity switch instruction signal from the even/odd judge means by selecting one of an output from the polarity switch means and an output from the recording pulse modulating means, and outputting a recording data signal; and a laser driving means for controlling the laser source in response to the recording data signal from the recording signal polarity switch means.

According to a twelfth aspect of the present invention, the above-mentioned apparatus includes an analog signal processing means performing amplification and waveform shaping for the electric signal output from the photodetector; a land/groove detecting means for detecting whether the spot of the focused light beam on the recording medium is in a land or a groove from an output from the analog signal processing means, and outputting a polarity switch instruction signal; a controller for controlling the information recording apparatus at the request of a host computer performing control and process as a whole; a recording pulse modulating means for modulating a recording pulse on the instruction from the controller; a recording pulse subtracting means for subtracting a recording pulse, which is output from the recording pulse modulating means, from a pulse of a constant period to provide a recording signal; a reproduction pulse subtracting means for subtracting a reproduction pulse from a pulse of a constant period to provide a reproduction signal; a recording signal polarity switch means for changing the signal polarity at recording in response to the polarity switch instruction signal from the land/groove detecting means by selecting one of an output from the recording pulse subtracting means and an output from the recording pulse modulating means, and outputting a recording data signal; and a laser driving means for controlling the laser source in response to the recording data signal from the recording signal polarity switch means.

According to a thirteenth aspect of the present invention, the above-mentioned apparatus includes an analog signal processing means performing amplification and waveform shaping for the electric signal output from the photodetector; a track address detecting means for detecting a track address from an output signal from the analog signal processing means; an even/odd judge means for judging whether the track address detected by the track address detecting means is even or odd, and outputting a polarity switch instruction signal; a reproduction signal polarity switch means for changing the signal polarity at reproduction in response to the polarity switch instruction signal from the even/odd judge means; a controller for controlling the information recording apparatus at the request of a host computer performing control and process as a whole; a recording pulse modulating means for modulating a recording pulse on the instruction from the controller; a recording pulse subtracting means for subtracting a recording pulse, which is output from the recording pulse modulating means, from a pulse of a constant period to provide a recording signal; a recording signal polarity switch means for changing the signal polarity at recording in response to the polarity switch instruction signal from the even/odd judge means by selecting one of an output from the recording pulse subtracting means and an output from the recording pulse modulating means, and outputting a recording data signal; and a laser driving means for controlling the laser source in response to the recording data signal from the recording signal polarity switch means.

According to a fourteenth aspect of the present invention, in an information recording medium having adjacent land and groove on which information is recorded, when different address data are respectively recorded in the land and the groove by pre-pits, each address data is recorded by changing the signal polarity of the address data to be recorded in the land and the signal polarity of the address data to be recorded in the groove.

According to a fifteenth aspect of the present invention, in the information recording medium, a pit position method is employed as a method of recording the data address, and the medium is fabricated so that the position of the address data recorded in the land is approximately synchronous with the position of the address data recorded in the groove.

According to a sixteenth aspect of the present invention, in an information recording medium having alternating lands and grooves, different address data are recorded by pre-pits in the lands and the grooves when information is recorded in the lands and the grooves, and signal polarities of the address data to be recorded in the lands and signal polarities of the address data to be recorded in the grooves are changeable.

According to a seventeenth aspect of the present invention, in a method of recording information on adjacent tracks having information pits, the polarity of a data signal to be recorded is changed between the tracks.

According to an eighteenth aspect of the present invention, in a method of recording information on an information recording medium having alternating lands and grooves, different address data are recorded by pre-pits in the lands and the grooves when information is recorded in the lands and the grooves, and signal polarities of the address data to be recorded in the lands and signal polarities of the address data to be recorded in the grooves are changeable.

DETAILED DESCRIPTION OF THE PREFERRED EMBODIMENTS

Figure 1:
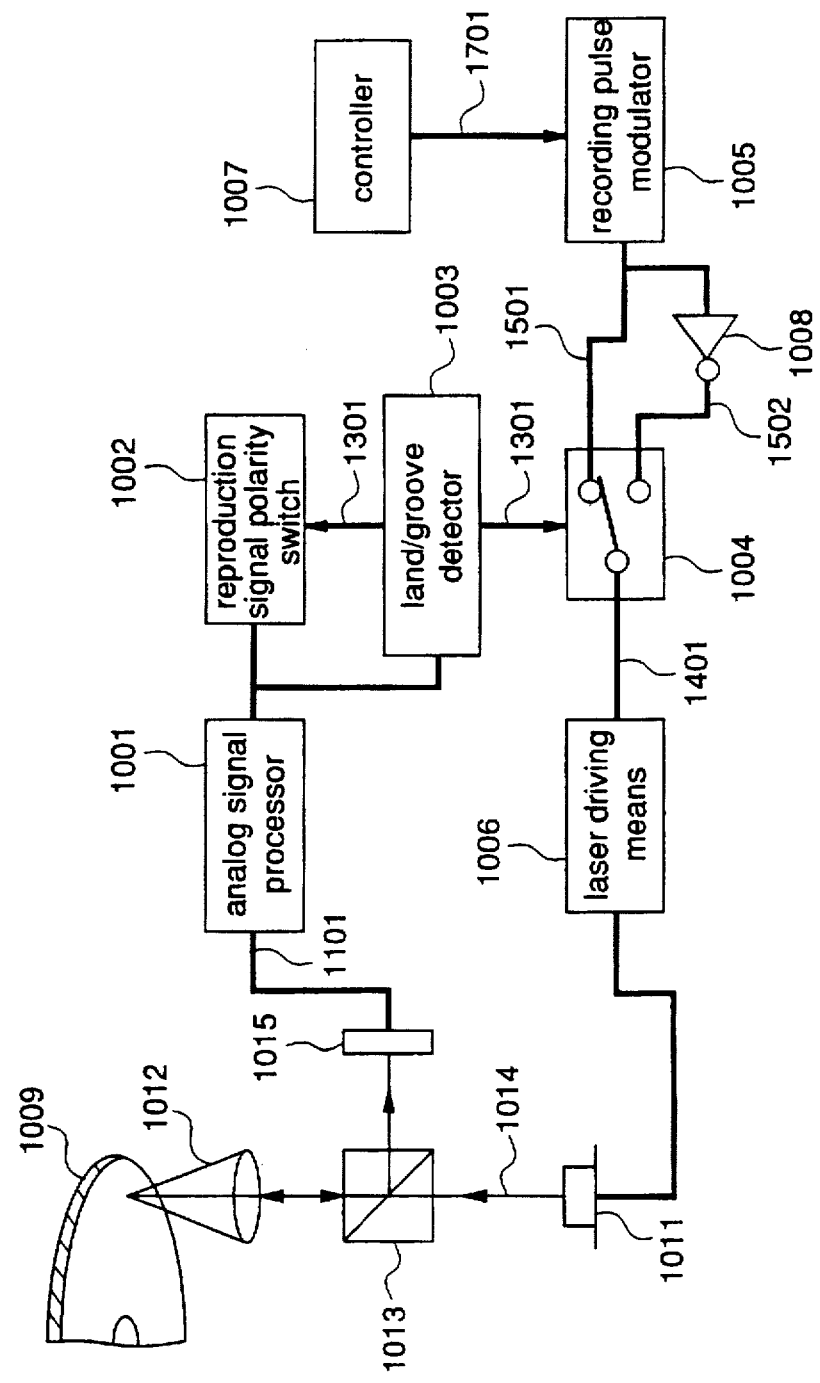
FIG. 1 is a block diagram illustrating an information recording apparatus according to a first embodiment of the present invention.

FIG. 1 is a block diagram illustrating an information recording apparatus according to a first embodiment of the present invention. The information recording apparatus includes a laser source 1011 emitting a laser beam 1014 for recording or reproducing data pits on a recording medium 1009, a beam splitter 1013, an objective lens 1012 for focusing the laser beam 1014 on the recording medium 1009, and a photodetector 1015 for converting the laser beam 1014 to an electric signal. The apparatus further includes an analog signal processor 1001 for performing amplification and waveform shaping for the electric signal output from the photodetector 1015, a land/groove detector 1003 for detecting whether a spot of the light beam 1014 focused on the recording medium 1009 is in a land or a groove from an output from the analog signal processor 1001, a reproduction signal polarity switch 1002 for changing the signal polarity at reproduction according to an output from the land/groove detector 1003, a controller 1007 for controlling the information recording apparatus at the request of an external host computer, a recording pulse modulator 1005 for modulating the recording pulse on the instruction of the controller 1007, a recording signal inverter 1008 for inverting the polarity of an output from the recording pulse modulator 1005, a recording signal polarity switch 1004 for changing the signal polarity at recording by selecting one of an output from the recording signal inverter 1008 and an output from the recording pulse modulator 1005 according to a polarity switch instruction signal output from the land/groove detector 1003, and a laser driving means 1006 for controlling the laser source 1011 in response to a recorded data signal from the recording signal polarity switch 1004.

Figure 5:
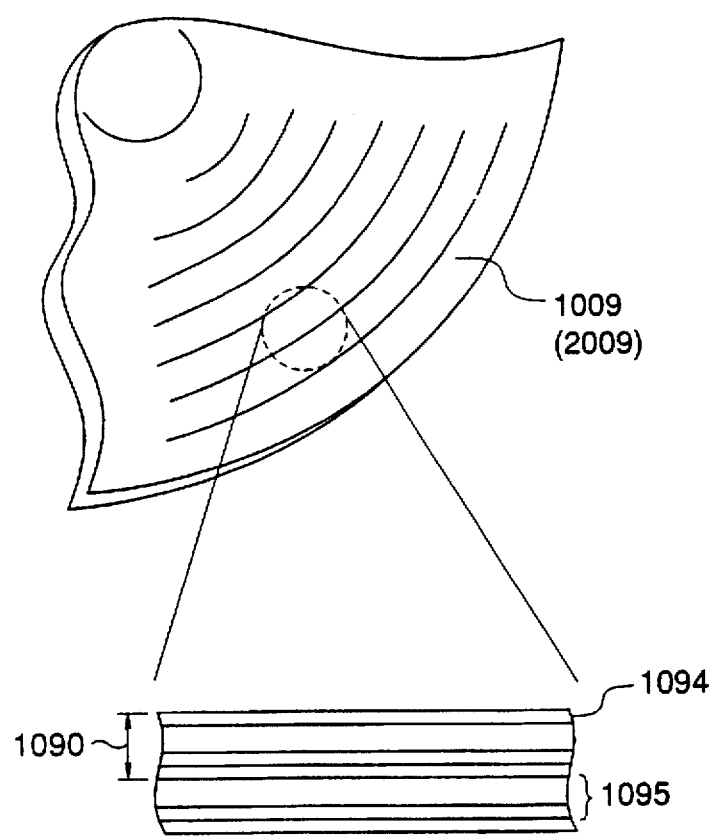
FIG. 5 is a schematic diagram illustrating a disk according to the present invention.

FIG. 5 is a schematic diagram illustrating a recording medium, and tracks, lands, and grooves on the recording medium.

As shown in FIG. 5, on a recording medium 1009, lands 1094 and grooves 1095 are alternatingly formed. This recording medium 1009 is an optical disk in which information is recorded in both the lands 1094 and the grooves 1095. When information is recorded in the recording medium 1009, a high-density recording system for recording different address data for the lands and the grooves by pre-pits is employed, and the signal polarity is changed between the address data recorded in the lands and the address data recorded in the grooves. These address data are recorded by pit position method, and the disk is formed so that the positions of data addresses in adjacent land and groove are approximately synchronous each other. The above-mentioned pre-pits are pits for previously recording an address signal and a synchronous signal at the head of each sector of the track. The pre-pits are formed when an optical disk is fabricated. Further, the above-mentioned pit position method is a method of giving data to intervals of round-pit-shaped marks, each mark having a center corresponding to "1" of recording data.

Figure 6:
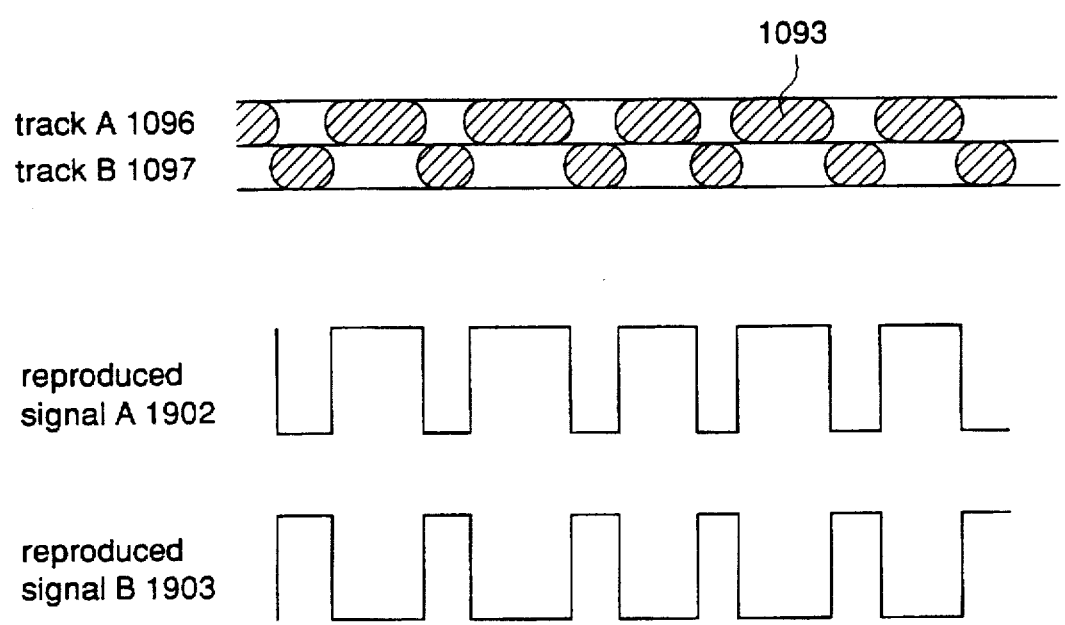
FIG. 6 is a schematic diagram illustrating waveforms of reproduced signals according to the present invention.

FIG. 6 shows waveforms of reproduced signals. In FIG. 6, reference numeral 1093 designates data pits, numerals 1096 and 1097 designate a track A and a track B, respectively, and numerals 1902 and 1903 designate a reproduced signal A and a reproduced signal B, respectively.

Figure 7:
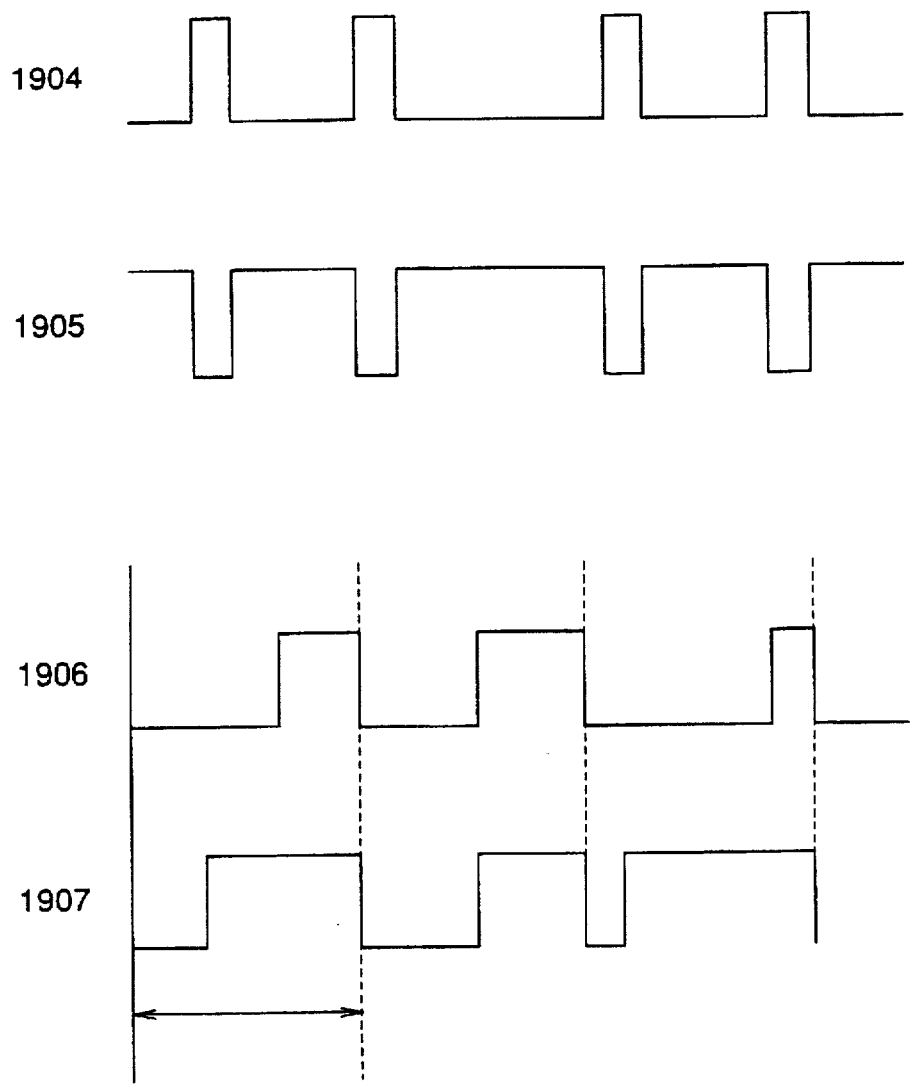
FIG. 7 is a schematic diagram illustrating waveforms of reproduced signals according to the present invention.

FIG. 7 shows waveforms of reproduced signals. In FIG. 7, reference numerals 1904, 1905, 1906, and 1907 designate pulse-shaped waveforms.

Figure 8:
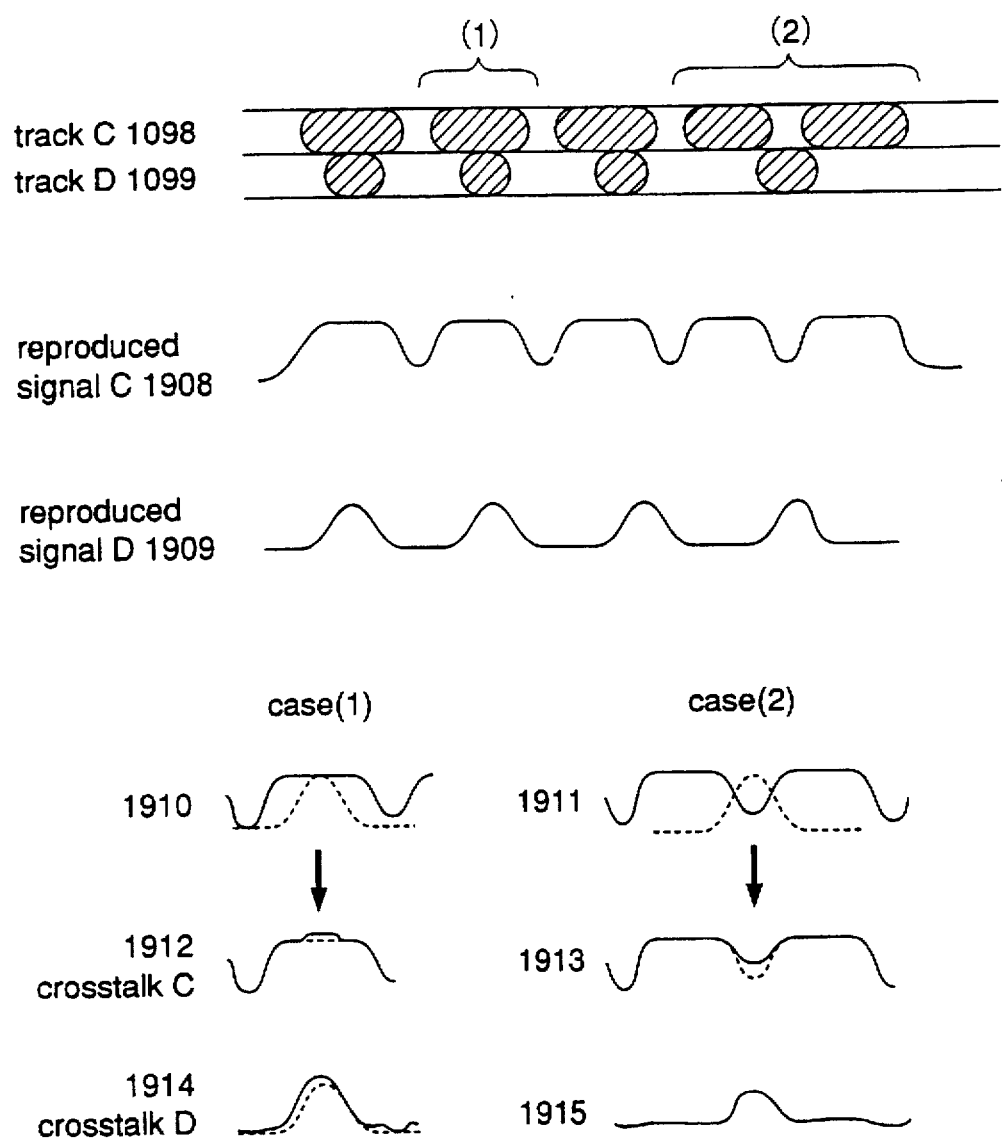
FIG. 8 is a schematic diagram illustrating waveforms of reproduced signals according to the present invention.
Figure 9:
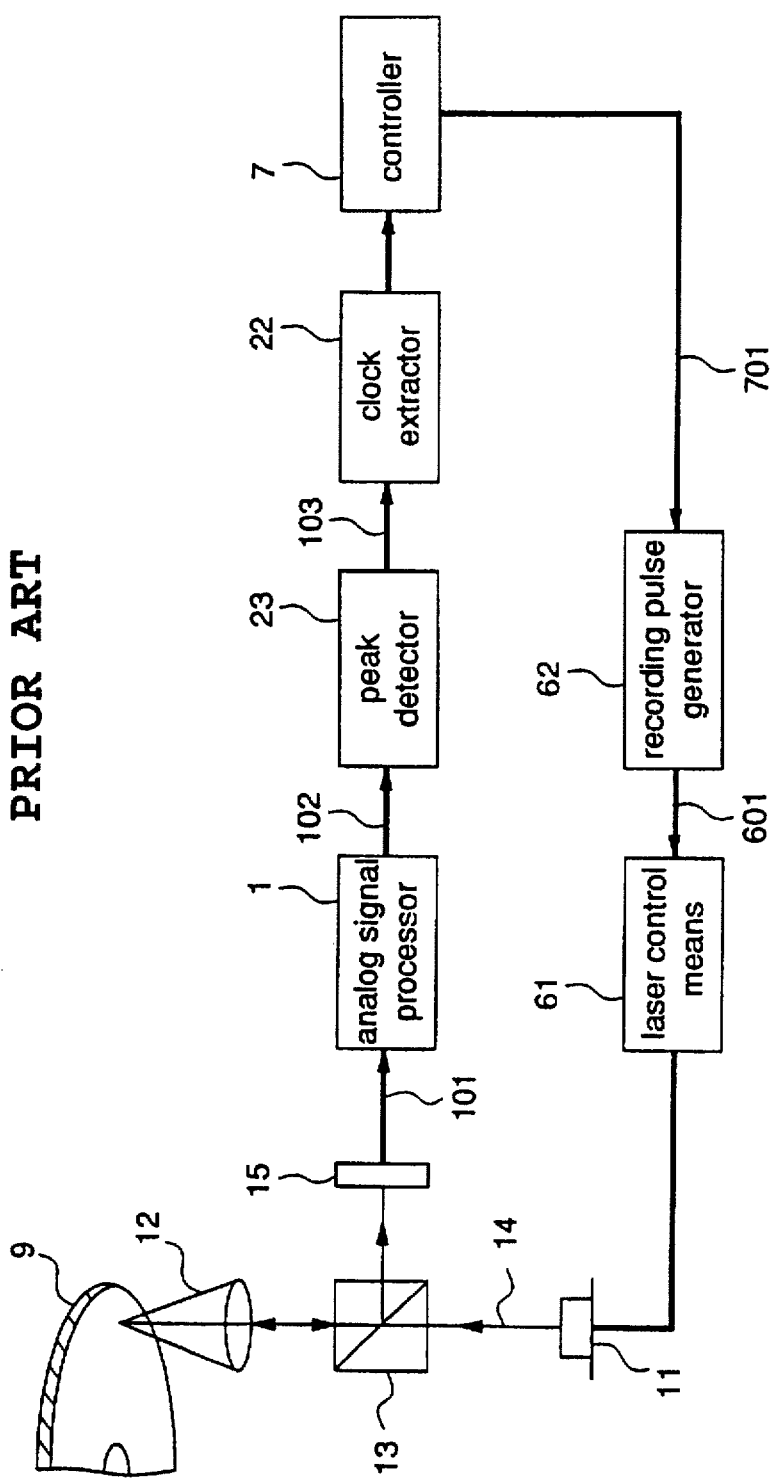
FIG. 9 is a block diagram illustrating a conventional information recording and reproducing system.
Figure 10:
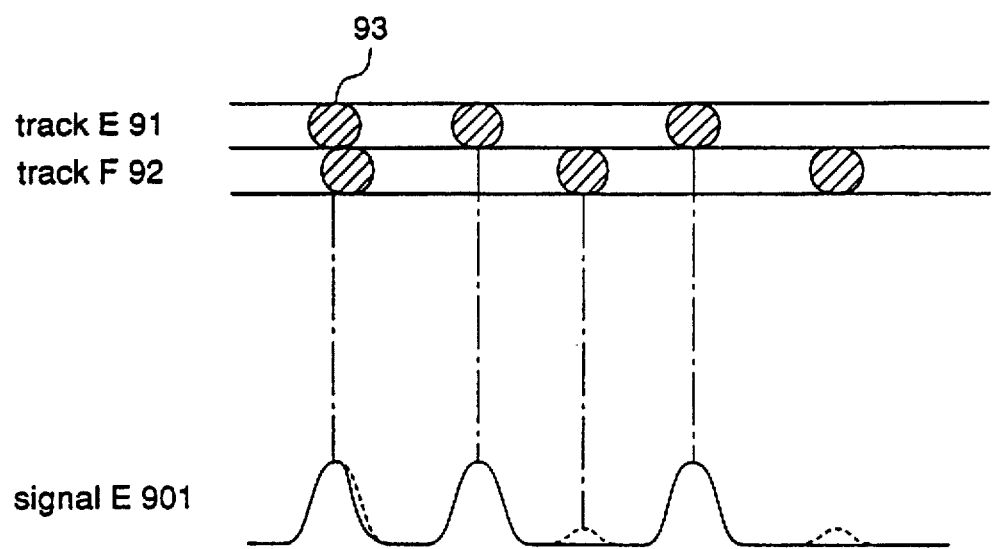
FIG. 10 is a schematic diagram illustrating waveforms of reproduced signals obtained in the conventional system.

FIG. 8 shows waveforms of reproduced signals. In FIG. 8, reference numerals 1908, 1909, 1910, 1911, 1912, 1913, 1914, and 1915 designate waveforms of reproduced analog signals, and numerals 1098 and 1099 designate tracks.

A description is given of the operation of the information recording apparatus.

First of all, the operation at reproduction of data will be described.

Initially, a laser beam 1014 emitted from the laser source 1011 travels through the beam splitter 1013 and is focused on a spot on the recording medium 1009 by the objective lens 1012. A portion of the laser beam 1014 is reflected at the recording medium 1009, and the reflected beam from the recording medium 1009 is again reflected by the beam splitter 1013 to the photodetector 1015. Since the reflected beam forms an image of the data pit 1093, which is recorded on the recording medium 1009, on the photodetector 1015, optical data is converted to electric data 1101 according to the existence of the image. This signal 1101 is subjected to amplification and waveform shaping by the analog signal processor 1001 and supplied to the reproduction signal polarity switch 1002 and the land/groove detector 1003.

The land/groove detector 1003 detects whether the position (spot) of the focused light beam 1014 on the recording medium 1009 is in the land 1094 or the groove 1095, and sends the result of the detection to the reproduction signal polarity switch 1002 and the recording signal polarity switch 1004.

Signals output from the reproduction signal polarity switch 1002 always have the same polarity, and these signals are input to the controller 1007, wherein data are reproduced.

In this way, at reproduction of data, the reproduction signal polarity switch 1002 switches the polarity of the reproduction signal 1101 according to the polarity of the recorded data signal, followed by reproduction of data.

On the other hand, at recording of data, recording instructions and data are sent from an external host computer to the controller 1007. Receiving instructions from the controller 1007, the recording pulse modulator 1005 modulates the recording pulse, and the recording signal inverter 1008 generates an inverted recording signal 1502. Then, the recording signal polarity switch 1004 is switched according to the polarity switch instruction signal 1301, and a recording data signal 1401 is applied to the laser driving means 1006.

Receiving the recording data signal 1401, the laser driving means 1006 drives the laser source 1011. At this time, the laser beam 1014 emitted from the laser source 1011 forms data pits 1093 on the track 1090 on the recording medium 1009 as shown in FIG. 6. The data pits 1093 so formed have two patterns, i.e., a pattern on the track C 1098 and a pattern on the track D 1099, as shown in FIG. 8. When the data pits on these tracks C 1098 and D 1099 are reproduced, reproduced signals C 1908 and D 1909 are obtained, respectively.

When the track C 1098 is reproduced, the reproduced signal is influenced by crosstalk due to the adjacent track D 1099. When the positional relationship of the data pits 1093 between the adjacent tracks is as shown by case (1) in FIG. 8, a reproduced signal waveform 1910 (solid line) is combined with an interference signal waveform (dotted line), resulting in a waveform shown by crosstalk C 1912 (solid line). In this case, the reproduced signal waveform is influenced by crosstalk. However, since the signal polarity having data on the reproduced signal waveform is opposite, in phase, from the signal polarity influenced by crosstalk, reproduced data is not adversely affected by crosstalk. On the other hand, when the positional relationship between the data pits on the adjacent tracks is as shown by case (2) in FIG. 8, a reproduced signal waveform 1911 (solid line) is combined with an interference signal waveform (dotted line), resulting in a waveform shown by crosstalk C 1913 (solid line). In this case, the peak level (amplitude) of the reproduced signal having data is reduced. However, since the polarity having data is opposite, in phase, from the polarity influenced by crosstalk as mentioned above, the influence of crosstalk is reduced to the minimum. Likewise, when the track D 1099 is reproduced, reproduced signal waveforms 1914 and 1915 (solid lines) are obtained. In both cases of reproducing the tracks C and D, the phase of the track is shifted from the phase of the adjacent track at random. So, the reproduced signals are hardly affected by crosstalk.

As described above, according to the first embodiment of the present invention, the land/groove detector 1003 detects whether the light beam 1014 focused on the recording medium 1009 is in the land or the groove and, at recording of data, an output from the recording pulse modulator 1005 is inverted, for the polarity, according to the output signal 1301 from the land/groove detector 1003. On the other hand, at reproduction of data, according to the output signal 1301 from the land/groove detector 1003, the signal polarity is changed by the reproduction signal polarity switch 1002. Therefore, recording and reproduction of signals, which are hardly affected by crosstalk between adjacent tracks, are realized, whereby the track pitch can be reduced, resulting in a high-density recording and reproduction.

Further, when information is recorded in both the land and the groove on the recording medium with alternating lands and grooves, since the high-density recording method wherein different address data are respectively recorded in the land and the groove by pre-pits is employed, the signal polarity of the address data to be recorded in the land and the signal polarity of the address data to be recorded in the groove are changeable, whereby the recording density is further increased.

Furthermore, the data address is recorded by the pit position method, and the disk is fabricated so that the data addresses of adjacent land and groove are approximately synchronous with each other. Therefore, unwanted influences of crosstalk are reduced.

Figure 2:
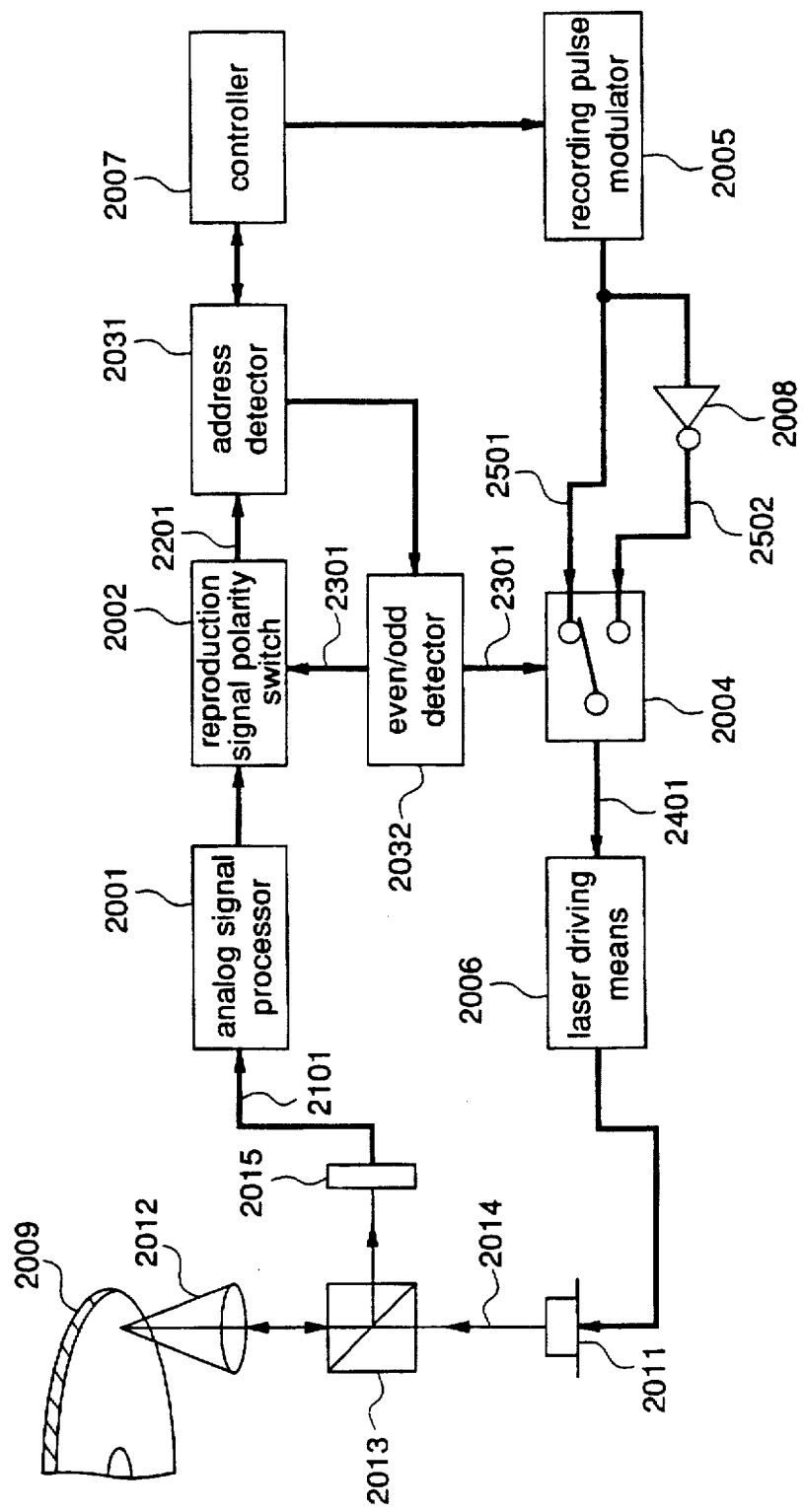
FIG. 2 is a block diagram illustrating an information recording apparatus according to a second embodiment of the present invention.

FIG. 2 is a block diagram illustrating an information recording apparatus according to a second embodiment of the present invention. The information recording apparatus includes a laser source 2011 emitting a laser beam 2014 for recording or reproducing data pits on a recording medium 2009, a beam splitter 2013, an objective lens 2012 for focusing the laser beam 2014 on the recording medium 2009, and a photodetector 2015 for converting the laser beam 2014 to an electric signal. The apparatus further includes an analog signal processor 2001 for performing amplification and waveform shaping for the electric signal output from the photodetector 2015, a track address detector 2031 for detecting a track address from an output from the analog signal processor 2001, an even/odd judge means 2032 for judging whether the track address detected by the detector 2031 is even or odd and outputting a polarity switch instruction signal, a reproduction signal polarity switch 2002 for changing the polarity of the reproduction signal in response to the polarity switch instruction signal, a controller 2007 for controlling the information recording apparatus at the request of an external host computer, a recording pulse modulator 2005 for modulating the recording pulse on the instruction of the controller 2007, a recording signal inverter 2008 for inverting the polarity of an output from the recording pulse modulator 2005, a recording signal polarity switch 2004 for changing the signal polarity at recording by selecting one of an output from the recording pulse modulator 2005 and an output from the recording signal inverter 2008 according to the polarity switch instruction signal output from the even/odd judge means 2032, and a laser driving means 2006 for controlling the laser source 2011 according to the recording data from the recording signal polarity switch 2004.

The operation of the information recording apparatus shown in FIG. 2 will be described hereinafter.

At reproduction of data, initially, a laser beam 2014 emitted from the laser source 2011 travels through the beam splitter 2013 and is focused on a spot on the recording medium 2009 by the objective lens 2012. A portion of the laser beam 2014 is reflected at the recording medium 2009, and the reflected beam from the recording medium 2009 is again reflected by the beam splitter 2013 to the photodetector 2015. Since the reflected beam forms an image of the data pit 1093, which is recorded on the recording medium 2009, on the photodetector 2015, optical data is converted to electric data 2101 according to the existence of the image. This signal 2101 is subjected to amplification and waveform shaping by the analog signal processor 2001 and applied to the reproduction signal polarity switch 2002.

An output signal 2201 from the reproduction signal polarity switch 2002 is input to the address detector 2031, wherein a track address is detected from the signal 2201. The track address is applied to the even/odd judge means 2032.

In the even/odd judge means 2032, it is judged whether the track address in the position (spot) where the laser beam 2014 is focused on the recording medium 2009 is even or odd, and the polarity of the signal to be recorded or reproduced is decided according to the result of the judgment. The result is input to the reproduction signal polarity switch 2002 or the recording signal polarity switch 2004 as a polarity switch instruction signal 2301.

Signals output from the reproduction signal polarity switch 2002 always have the same polarity, and these signals are input to the controller 2007, wherein reproduction of data is performed. In this way, at reproduction of data, the reproduction signal polarity switch 2002 switches the polarity of the reproduction signal 2101 according to the polarity of the recorded data signal, whereby the data is reproduced.

On the other hand, at recording of data, the recording pulse is modulated by the recording pulse modulator 2005 on the instruction from the controller 2007, and an inverted recording signal 2502 is generated by the recording signal inverter 2008. Then, the recording signal polarity switch 2004 is switched according to the polarity switch instruction signal 2301 from the even/odd judge means 2032, and a recording data signal 2401 is applied to the laser driving means 2006.

Receiving the recording data signal 2401, the laser driving means 2006 drives the laser source 2011. At this time, the laser beam 2014 emitted from the laser source 2011 forms data pits on the tracks on the recording medium 2009.

Also in this second embodiment of the invention, reproduced signal waveforms, which are hardly affected by crosstalk due to adjacent tracks, are realized.

As described above, in the information recording apparatus according to the second embodiment of the invention, the track address detector 2031 detects a track address from an output signal from the analog signal processor 2001, and the even/odd judge means 2032 judges whether the detected track address is even or odd. At recording of data, according to the result of the even/odd judgment, the polarity of an output signal from the recording pulse modulator 2005 is inverted. At reproduction of data, the signal polarity is changed by the reproduction signal polarity switch 2002 according to the result of the even/odd judgment. Therefore, recording and reproduction of signals, which are not adversely affected by crosstalk between adjacent tracks, are realized, so that the track pitch can be reduced, resulting in high-density recording and reproduction.

Furthermore, since undesired influences of crosstalk are reduced using an optical method, the track pitch can be reduced, resulting in an increase in the recording density.

Figure 3:
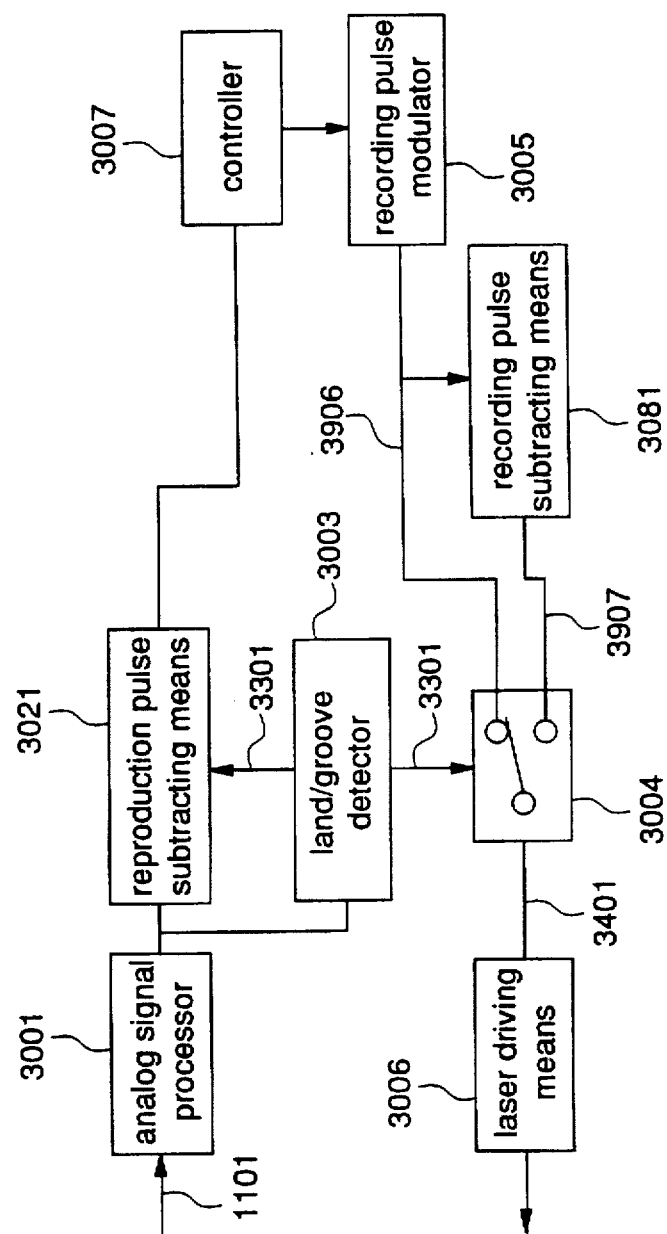
FIG. 3 is a block diagram illustrating an information recording apparatus according to a third embodiment of the present invention.

FIG. 3 is a block diagram illustrating a part of an information recording apparatus according to a third embodiment of the present invention. As in the information recording apparatus according to the first embodiment of the invention shown in FIG. 1, the information recording apparatus according to this third embodiment includes a laser source 1011 emitting a laser beam 1014 for recording or reproducing data pits on a recording medium 1009, a beam splitter 1013, an objective lens 1012 for focusing the laser beam 1014 on the recording medium 1009, and a photodetector 1015 for converting the laser beam 1014 to an electric signal, although these elements are not shown in FIG. 3. The apparatus further includes an analog signal processor 3001 for performing amplification and waveform shaping for the electric signal output from the photodetector 1015, a land/groove detector 3003 for detecting whether the position (spot) of the focused laser beam 1014 on the recording medium 1009 is in a land or a groove from an output signal from the analog signal processor 3001, a controller 3007 for controlling the apparatus at the request of an external host computer, a recording pulse modulator 3005 for modulating the recording pulse on the instruction of the controller 3007, a recording signal subtracting means 3081 for subtracting the recording pulse, which is output from the recording pulse modulator 3005, from a pulse of a constant period to obtain a recording signal, a reproduction signal subtracting means 3021 for subtracting the reproduction pulse from a pulse of a constant period to obtain a reproduction signal, a recording signal polarity switch 3004 for changing the signal polarity at recording by selecting one of an output from the recording signal subtracting means 3081 and an output from the recording pulse modulator 3005 according to a polarity switch instruction signal output from the land/groove detector 3003, and a laser driving means 3006 for controlling the laser source 1011 according to the recording data from the recording signal polarity switch 3004.

The operation of the information recording apparatus will be described using FIGS. 1 and 3.

First of all, the operation at reproduction of data will be described. A laser beam 1014 emitted from the laser source 1011 is focused on a spot on the recording medium 1009 by the objective lens 1012, and a portion of the laser beam 1014 is reflected at the recording medium 1009. The reflected beam from the recording medium 1009 is again reflected by the beam splitter 1013 to the photodetector 1015. Since the reflected light beam forms an image of the data pit 1093, which is recorded on the recording medium 1009, on the photodetector 1015, optical data is converted to electric data 1101 according to the presence of the image. This data signal 1101 is subjected to amplification and waveform shaping by the analog signal processor 3001, and supplied to the reproduction subtracting means 3021 and the land/groove detector 3003.

In the land/groove detector 3003, it is detected whether the position (spot) of the focused laser beam 1014 on the recording medium 1009 is in a land 1094 or a groove 1095 (refer to FIG. 5), and the result of the detection is applied to the reproduction signal subtracting means 3021 or the recording signal polarity switch 3004, as a polarity switch instruction signal 3301. As a result, at reproduction of data, the reproduction signal subtracting means 3021 switches the processing method for the reproduction signal 1101 according to the polarity of the recorded data signal, followed by reproduction of data. More specifically, when the land 1094 is detected, subtraction is carried out and the processing for the reproduction signal 1101 is changed, followed by reproduction of data. On the other hand, when the groove 1095 is detected, subtraction is not carried out and the processing for the reproduction signal 1101 is not changed, followed by reproduction of data.

On the other hand, at recording of data, according to the instruction from the controller 3007, the recording pulse is modulated by the recording pulse modulator 3005, and a modulated recording signal 3907 is generated by the recording signal subtracting means 3081. Then, the recording signal polarity switch 3004 is switched according to the signal switch instruction signal 3301 from the land/groove detector 3003, and a recording data signal 3401 is applied to the laser driving means 3006.

Receiving the recording data signal 3401, the laser driving means 3006 controls the laser source 1011. At this time, the laser beam 1014 emitted from the laser source 1011 forms data pits on the tracks on the recording medium 1009.

The recording signal subtracting means 3081 converts the recording signal 3907 from the waveform 1906 to the waveform 1907 shown in FIG. 7. The reproduction signal subtracting means 3021 performs the reverse of the above-mentioned conversion. By this conversion, a reproduced signal waveform, which is hardly affected by crosstalk due to adjacent tracks, is obtained.

By the way, the signal 3906 having the waveform 1906 is output only at the recording. More specifically, when a data recording instruction and data to be recorded are sent to the controller 3007 from an external host computer, the controller 3007 processes the data using a modulation method suitable for the drive. The data processed by the controller 3007 is sent to the recording pulse modulator 3005. In the recording pulse modulator 3005, the processed data is again processed to obtain a signal 3906 suitable for recording, and the processed signal 3906 is applied to the recording signal subtracting means 3081 and the recording signal polarity switch 3004.

As described above, in the information recording apparatus according to the third embodiment of the invention, the land/groove detector 3003 detects whether the position (spot) of the focused laser beam 1014 on the recording medium 1009 is in a land 1094 or a groove 1095. At recording of data, an output from the recording pulse modulator 3005 is designated as a first recording signal while a signal obtained by subtracting the recording pulse, which is output from the recording pulse modulator 3005, from a pulse of a constant period by the recording signal subtracting means 3081 is designated as a second recording signal, and the recording signal polarity switch 3004 switches the polarity of the signal to be recorded by selecting one of the first and second recording signals, followed by recording of data. On the other hand, at reproduction of data, the reproduction pulse is subtracted from a pulse of a constant period by the reproducing signal subtracting means 3021 to provide a reproduction signal, followed by reproduction of data. Therefore, recording and reproduction of signals, which are not adversely affected by crosstalk between adjacent tracks, are realized, so that the track pitch can be reduced, resulting in high-density recording and reproduction.

Further, in recording of address data by pre-pits, since the signal polarity of the address data to be recorded is changed between adjacent land and groove, reproduction of signals, which are hardly affected by crosstalk, is realized.

Figure 4:
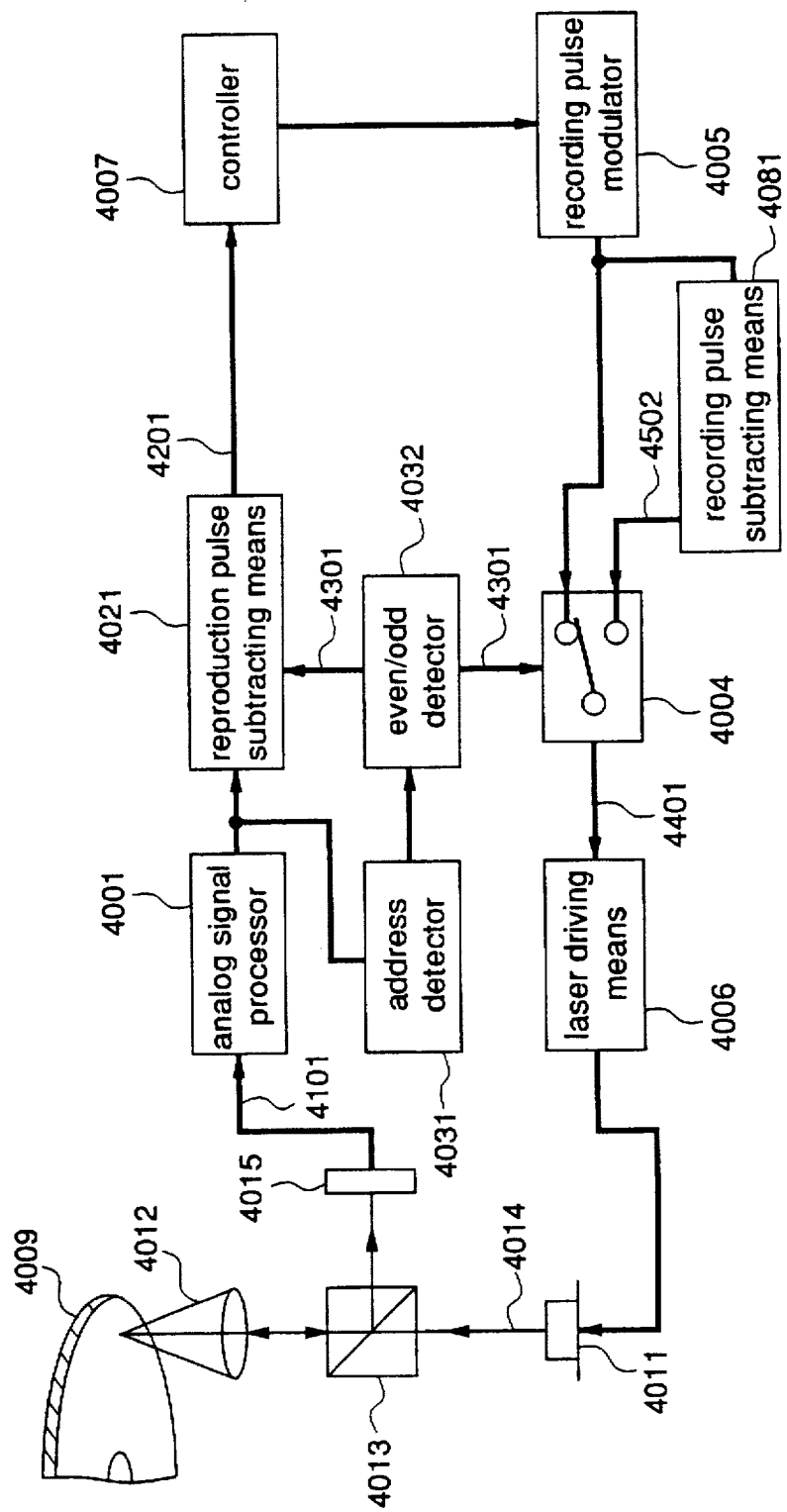
FIG. 4 is a block diagram illustrating an information recording apparatus according to a first embodiment of the present invention.

FIG. 4 is a block diagram illustrating an information recording apparatus according to a fourth embodiment of the present invention. The information recording apparatus includes a laser source 4011 emitting a laser beam 4014 for recording or reproducing data pits on a recording medium 4009, a beam splitter 4013, an objective lens 4012 for focusing the laser beam 4014 on the recording medium 4009, and a photodetector 4015 for converting the laser beam 4014 to an electric signal. The apparatus further includes an analog signal processor 4001 for performing amplification and waveform shaping for the electric signal output from the photodetector 4015, a track address detector 4031 for detecting a track address from an output from the analog signal processor 4001, an even/odd judge means 2032 for judging whether the track address detected by the detector 4031 is even or odd and outputting a polarity switch instruction signal, a reproduction pulse subtracting means 4021 for changing the signal polarity at reproduction according to the polarity switch instruction signal and subtracting the reproduction pulse from a pulse of a constant period to produce a reproduction signal, a controller 4007 for controlling the information recording apparatus at the request of an external host computer, a recording pulse modulator 4005 for modulating the recording pulse on the instruction of the controller 4007, a recording pulse subtracting means 4081 for subtracting the recording pulse, which is output from the recording pulse modulator 4005, from a pulse of a constant period to produce a recording signal, a recording signal polarity switch 4004 for changing the signal polarity at recording by selecting one of an output from the recording pulse subtracting means 4081 and an output from the recording pulse modulator 4005 according to the polarity switch instruction signal output from the even/odd judge means 4032, and a laser driving means 4006 for controlling the laser source 4011 according to the recording data from the recording signal polarity switch 4004.

A description is now given of the operation of the information recording apparatus.

First of all, the operation at reproduction of data will be described. A laser beam 4014 emitted from the laser source 4011 travels through the beam splitter 4013 and is focused on a spot on the recording medium 4009 by the objective lens 4012. A portion of the laser beam 4014 is reflected at the recording medium 4009, and the reflected beam from the recording medium 4009 is again reflected by the beam splitter 4013 to the photodetector 4015. Since the reflected light beam forms an image of the data pit 1093, which is recorded on the recording medium 4009, on the photodetector 4015, optical data is converted to electric data 4101 according to the existence of the image. This signal 4101 is subjected to amplification and waveform shaping by the analog signal processor 4001 and applied to the reproduction pulse subtracting means 4021 and the track address detector 4031.

A signal 4201 output from the reproduction pulse subtracting means 4021 is input to the controller 4007. The controller 4007 demodulates the signal 4201 and returns the signal to the host computer. On the other hand, in the track address detector 4031, a track address is detected on the basis of the signal 4101, and the detected signal is input to the even/odd judge means 4032.

In the even/odd judge means 4032, it is judged whether the track address in the position (spot) where the laser beam 4014 is focused on the recording medium 4009 is even or odd. According to the result of the judgment, the even/odd judge means 4032 decides the polarity of the signal to be recorded or reproduced and sends the decision to the reproduction pulse subtracting means 4021, as a polarity switch instruction signal 4301. In this way, at reproduction of data, the reproduction pulse subtracting means 4021 switches the polarity of the reproduction signal 4101 according to the polarity of the recorded data signal, followed by reproduction of data.

On the other hand, at recording of data, the recording pulse is modulated by the recording pulse modulator 4005 on the instruction from the controller 4007, and an inverted recording signal 4502 is generated by the recording pulse subtracting means 4081. Then, the recording signal polarity switch 4004 is switched according to the polarity switch instruction signal 4301 from the even/odd judge means 4032, and a recording data signal 4401 is applied to the laser driving means 4006.

Receiving the recording data signal 4401, the laser driving means 4006 drives the laser source 4011. At this time, the laser beam 4014 emitted from the laser source 4011 forms data pits on the tracks on the recording medium 4009.

Also in this fourth embodiment of the invention, reproduced signal waveforms, which are hardly affected by crosstalk due to adjacent tracks, are realized.

As described above, in the information recording apparatus according to the fourth embodiment of the invention, the even/odd judge means 4032 judges whether the track address detected by the track address detector 4031 is even or odd. At recording of data, an output from the recording pulse modulator 4005 is designated as a first recording signal while a signal obtained by subtracting the recording pulse, which is output from the recording pulse modulator 4005, from a pulse of a constant period by the recording pulse subtracting means 4081 is designated as a second recording signal, and one of the first and second recording signals is selected by the recording signal polarity switch 3003 to change the polarity of the signal to be recorded, followed by recording of data. On the other hand, at reproduction of data, the signal polarity is changed by the reproduction pulse subtracting means 4021 on the basis of the polarity switch instruction signal 4301 output from the even/odd judge means 4032, and the reproduction pulse is subtracted from a pulse of a constant period to provide a reproduction signal, followed by reproduction of data. Therefore, recording and reproduction of signals, which are hardly affected by crosstalk between adjacent tracks, are realized, whereby the track pitch can be reduced, resulting in high-density recording and reproduction.

Further, since undesired influences of crosstalk are reduced using an electrical method, the track pitch can be reduced, resulting in an increase in the recording density.

What is claimed is:

1. An information recording apparatus comprising:
   laser source emitting a laser beam for reproducing or recording data pits on a recording medium;
   an objective lens for focusing the laser beam in a spot on the recording medium;
   a photodetector for converting the laser beam reflected at the recording medium into an electric signal;
   a signal processor for processing the electric signal output from the photodetector; and
   means for changing the polarity of data signals to be recorded on tracks having the data pits such that all the data signals recorded on one track are recorded with one polarity and all the data signals recorded in adjacent tracks are recorded with a polarity opposite to said one polarity.

2. The apparatus of claim 1 comprising:
   an even/odd judge means for judging whether a track address is even or odd and outputting a polarity switch instruction signal; and
   a polarity switch means for changing the polarity of a data signal to be recorded in response to the polarity switch instruction signal from the even/odd judge means.

3. The apparatus of claim 1 comprising:
   a land/groove detecting means for detecting whether the spot of the focused light beam on the recording medium is in a land or a groove and outputting a polarity switch instruction signal; and
   a polarity switch means for changing the polarity of the data signal to be recorded in response to the polarity switch instruction signal from the land/groove detector.

4. The apparatus of claim 1 comprising:
   an even/odd judge means for judging whether a track address is even or odd and outputting a polarity switch instruction signal;
   an operating means for generating a desired pulse width using an arithmetic element to change a recording pulse width at recording; and
   a pulse width switch means for changing the recording pulse width in response to the polarity switch instruction signal from the even/odd judge means.

5. The apparatus of claim 1 comprising:
   a land/groove detecting means for detecting whether the spot of the focused light beam on the recording medium is in a land or a groove and outputting a polarity switch instruction signal;
   an operating means for generating a desired pulse width using an arithmetic element to change a recording pulse width at recording; and a pulse width switch means for changing the recording pulse width in response to the polarity switch instruction signal from the land/groove detecting means.

6. The apparatus of claim 1 comprising:

an even/odd judge means for judging whether a track address is even or odd and outputting a polarity switch instruction signal;

a signal switch means for changing the polarity of the data signal to be recorded at recording; and a polarity switch means for selecting one of the data signal changed by the signal switch means and the data signal before the change, in response to the polarity switch instruction signal from the even/odd judge means;

wherein the polarity of a data pit line to be recorded is changed between adjacent tracks by changing the data signal to be recorded in response to the polarity switch instruction signal from the even/odd judge means.

7. The apparatus of claim 1 comprising:

a land/groove detecting means for detecting whether the spot of the focused light beam on the recording medium is in a land or a groove and outputting a polarity switch instruction signal to change the polarity of a data signal to be recorded;

a signal switch means for changing the polarity of the data signal to be recorded at recording; and a polarity switch means for selecting one of the data signal changed by the signal switch means and the data signal before the change, in response to the polarity switch instruction signal from the land/groove detecting means;

wherein the polarity of a data pit line to be recorded is changed between adjacent tracks by changing the data signal to be recorded in response to the polarity switch instruction signal from the land/groove detecting means.

8. The apparatus of claim 1 comprising:

an even/odd judge means for judging whether a track address is even or odd and outputting a polarity switch instruction signal; and a reproduction signal polarity switch means for changing the polarity of the recorded data pit in response to the polarity switch instruction signal from the even/odd judge means when recorded data is reproduced from the recording medium.

9. The apparatus of claim 1 comprising:

a land/groove detecting means for detecting whether the spot of the focused light beam on the recording medium is in a land or a groove and outputting a polarity switch instruction signal;

a reproduction signal polarity switch means for changing the polarity of the recorded data pit in response to the polarity switch instruction signal from the land/groove detecting means when recorded data is reproduced from the recording medium.

10. The apparatus of claim 1 comprising:

an analog signal processing means performing amplification and waveform shaping for the electric signal output from the photodetector;

a land/groove detecting means for detecting whether the spot of the focused light beam on the recording medium is in a land or a groove from an output from the analog signal processing means, and outputting a polarity switch instruction signal;

a reproduction signal polarity switch means for changing the signal polarity at reproduction in response to the polarity switch instruction signal from the land/groove detecting means;

a controller for controlling the information recording apparatus at the request of a host computer performing control and process as a whole;

a recording pulse modulating means for modulating a recording pulse on the instruction from the controller;

a polarity switch means for changing the polarity of an output from the recording pulse modulating means;

a recording signal polarity switch means for changing the signal polarity at recording in response to the polarity switch instruction signal from the land/groove detecting means by selecting one of an output from the polarity switch means and an output from the recording pulse modulating means, and outputting a recording data signal; and a laser driving means for controlling the laser source in response to the recording data signal from the recording signal polarity switch means.

11. The apparatus of claim 1 comprising:

an analog signal processing means performing amplification and waveform shaping for the electric signal output from the photodetector;

a track address detecting means for detecting a track address from an output signal from the analog signal processing means;

an even/odd judge means for judging whether the track address detected by the track address detecting means is even or odd, and outputting a polarity switch instruction signal;

a reproduction signal polarity switch means for changing the signal polarity at reproduction in response to the polarity switch instruction signal from the even/odd judge means;

a controller for controlling the information recording apparatus at the request of a host computer performing control and process as a whole;

a recording pulse modulating means for modulating a recording pulse on the instruction from the controller;

a polarity switch means for changing the polarity of an output from the recording pulse modulating means;

a recording signal polarity switch means for changing the signal polarity at recording in response to the polarity switch instruction signal from the even/odd judge means by selecting one of an output from the polarity switch means and an output from the recording pulse modulating means, and outputting a recording data signal; and a laser driving means for controlling the laser source in response to the recording data signal from the recording signal polarity switch means.

12. The apparatus of claim 1 comprising:

an analog signal processing means performing amplification and waveform shaping for the electric signal output from the photodetector;

a land/groove detecting means for detecting whether the spot of the focused light beam on the recording medium is in a land or a groove from an output from the analog signal processing means, and outputting a polarity switch instruction signal;

a controller for controlling the information recording apparatus at the request of a host computer performing control and process as a whole;

a recording pulse modulating means for modulating a recording pulse on the instruction from the controller;

a recording pulse subtracting means for subtracting a recording pulse, which is output from the recording pulse modulating means, from a pulse of a constant period to provide a recording signal;

a reproduction pulse subtracting means for subtracting a reproduction pulse from a pulse of a constant period to provide a reproduction signal;

a recording signal polarity switch means for changing the signal polarity at recording in response to the polarity switch instruction signal from the land/groove detecting means by selecting one of an output from the recording pulse subtracting means and an output from the recording pulse modulating means, and outputting a recording data signal; and a laser driving means for controlling the laser source in response to the recording data signal from the recording signal polarity switch means.

13. The apparatus of claim 1 comprising:

an analog signal processing means performing amplification and waveform shaping for the electric signal output from the photodetector;

a track address detecting means for detecting a track address from an output signal from the analog signal processing means;

an even/odd judge means for judging whether the track address detected by the track address detecting means is even or odd, and outputting a polarity switch instruction signal;

a reproduction signal polarity switch means for changing the signal polarity at reproduction in response to the polarity switch instruction signal from the even/odd judge means;

a controller for controlling the information recording apparatus at the request of a host computer performing control and process as a whole;

a recording pulse modulating means for modulating a recording pulse on the instruction from the controller;

a recording pulse subtracting means for subtracting a recording pulse, which is output from the recording pulse modulating means, from a pulse of a constant period to provide a recording signal;

a recording signal polarity switch means for changing the signal polarity at recording in response to the polarity switch instruction signal from the even/odd judge means by selecting one of an output from the recording pulse subtracting means and an output from the recording pulse modulating means, and outputting a recording data signal; and a laser driving means for controlling the laser source in response to the recording data signal from the recording signal polarity switch means.

14. An information recording medium having adjacent land and groove on which information is recorded wherein, when different address data are respectively recorded in the land and the groove by pre-pits, each address data is recorded by changing the signal polarity of the address data to be recorded in the land and the signal polarity of the address data to be recorded in the groove.

15. The information recording medium of claim 14 wherein a pit position method is employed as a method of recording the data address, and the medium is fabricated so that the position of the address data recorded in the land is approximately synchronous with the position of the address data recorded in the groove.

16. An information recording medium having alternating lands and grooves, wherein different address data are recorded by pre-pits in the lands and the grooves when information is recorded in the lands and the grooves, and signal polarities of the address data to be recorded in the lands and signal polarities of the address data to be recorded in the grooves are opposite with respect to each other.

17. A method of recording information on adjacent tracks having information pits, wherein the polarity of a data signal to be recorded is made opposite between the tracks.

18. A method of recording information on an information recording medium having alternating lands and grooves, wherein different address data are recorded by pre-pits in the lands and the grooves when information is recorded in the lands and the grooves, and signal polarities of the address data to be recorded in the lands and the signal polarities of the address data to be recorded in the grooves are opposite with respect to each other.

* * * * *